United States Patent [19]

Cherveny

[11] Patent Number: 5,063,984

[45] Date of Patent: Nov. 12, 1991

[54] SOLAR HEATING DRAPERY OPENING INDCATOR

[76] Inventor: Albert G. Cherveny, 18655 Willow Ave., Country Club Hills, Ill. 60478

[21] Appl. No.: 668,970

[22] Filed: Mar. 13, 1991

[51] Int. Cl.⁵ ............................................. E05F 15/20
[52] U.S. Cl. ............................................ 160/7; 160/1; 340/586; 340/588; 340/595
[58] Field of Search ................... 160/1, 7, 5; 340/584, 340/586, 588, 595

[56] References Cited

U.S. PATENT DOCUMENTS

| | | | |
|---|---|---|---|
| 595,343 | 12/1897 | Roth | 160/5 |
| 2,288,465 | 6/1942 | Knudsen | 126/428 |
| 3,634,840 | 1/1972 | Wilkinson | 340/595 |
| 3,675,023 | 7/1972 | Kunke et al. | 160/5 |
| 3,882,451 | 5/1975 | Fujishiro et al. | 340/595 |
| 3,885,152 | 5/1975 | Anetseder et al. | 160/5 |
| 3,990,635 | 11/1976 | Restle et al. | 126/429 |
| 4,002,159 | 1/1977 | Angilletta | 126/429 |
| 4,054,125 | 10/1977 | Eckels | 126/429 |
| 4,201,189 | 5/1980 | Saunders | 126/429 |
| 4,212,289 | 7/1980 | Herbert | 126/428 |
| 4,294,038 | 10/1981 | Davidson | 126/429 |
| 4,296,733 | 10/1981 | Saunders | 126/428 |
| 4,296,734 | 10/1981 | Nevins | 126/429 |
| 4,301,787 | 11/1981 | Rice | 126/429 |
| 4,305,235 | 12/1981 | Roston | 126/428 |
| 4,309,981 | 1/1982 | Briggs et al. | 126/428 |
| 4,313,420 | 2/1982 | Poeschl | 126/428 |
| 4,369,766 | 1/1983 | Coley | 126/429 |
| 4,407,267 | 10/1983 | Heden | 126/429 |
| 4,409,960 | 10/1983 | Balzer | 126/428 |
| 4,421,098 | 12/1983 | Meta | 126/429 |
| 4,428,358 | 1/1984 | Adamson | 126/428 |
| 4,433,923 | 2/1984 | Rascati et al. | 340/584 |
| 4,494,527 | 1/1985 | Resnick et al. | 126/429 |
| 4,497,145 | 2/1985 | Louwenaar | 126/428 |
| 4,505,259 | 3/1985 | Seppanen et al. | 126/429 |
| 4,527,548 | 7/1985 | Gustafson | 126/428 |
| 4,565,186 | 1/1986 | Takata et al. | 126/428 |
| 4,644,990 | 2/1987 | Webb et al. | 160/5 |
| 4,649,901 | 5/1987 | Kelly | 126/429 |
| 4,727,918 | 3/1988 | Schoeder | 160/5 |

Primary Examiner—Carroll B. Dority
Attorney, Agent, or Firm—Robert S. Beiser

[57] ABSTRACT

A solar heating device which indicates the proper window covering status for maximum energy conservation. A support structure (18) rests on window sill (16) and suspends two thermistors (22 and 24). One thermistor (22) is supported on the room side of drapery (12) and the other thermistor (24) is supported between drapery (12) and a window (14). When the net heat flow is inward from outside the room, thermistor (24) near window (14) will be warmer than room side thermistor (22). When this occurs, the temperature dependent resistances of thermistors (22 and 24), voltage divider resistances (30 and 32), and a comparator (36) turn on a light emitting diode (28). This indicates that drapery (12) should be opened to let solar radiation in to heat the room. Otherwise, drapery (12) should be closed to conserve the existing heat in the room.

15 Claims, 4 Drawing Sheets

SOLAR HEATING DRAPERY OPENING INDCATOR

BACKGROUND

1. Field of Invention

This invention relates to solar heating devices, specifically to one which indicates when an open or closed window covering results in maximum heat conservation.

2. Description of Prior Art

Heretofore, heating systems required substantial investment in retrofitting or new facilities to utilize solar energy.

Also, on a sunny day, drapes or other window coverings should be opened to let solar radiation in to help heat the room. During cloudy days or at night, however, net heat is lost thru the window by conduction and convection. Under these circumstances the drapery or other window covering should be closed to help reduce heating costs and conserve energy. On partly cloudy days or during indirect sunlight it may be less obvious if an open or closed drapery will contribute to energy savings.

This invention tells the occupant of a room explicitly when to open or close a thermally insulating window covering for maximum energy savings. Also, another version automatically opens or closes the window covering. These benefits can be easily implemented in almost all existing structures for minimal cost.

Until now, heating energy conservation techniques known suffer from a number of disadvantages:
   (a) Their utilization requires significant retrofitting or completely new structures.
   (b) Room comfort is compromised by lower temperatures.
   (c) Economics are unfeasible.

OBJECTS AND ADVANTAGES

Accordingly, several objects and advantages of my invention are:
   (a) to utilize solar heating with a simple retrofit on present structures.
   (b) to conserve heating energy without sacrificing comfort.
   (c) to utilize solar heating in an economically feasible manner.

Further objects and advantages of my invention will become apparent from a consideration of the drawings and ensuing description of it.

DRAWING FIGURES

In the drawings, closely related figures have the same number but different alphabetic suffixes.

Figure 1A:
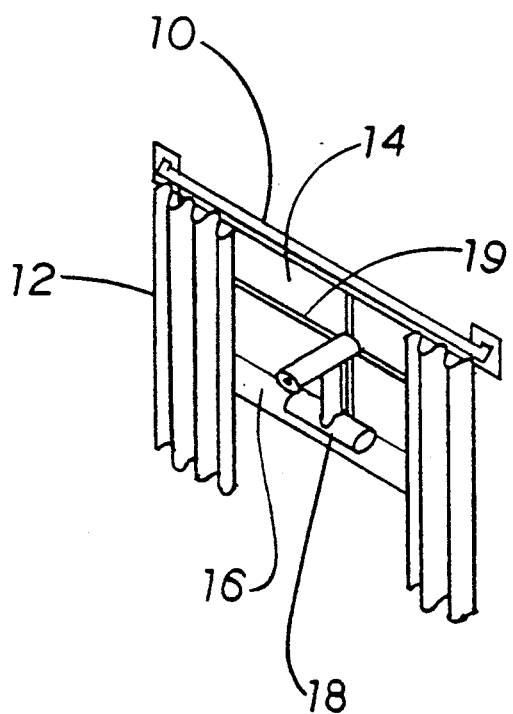
FIG. 1A illustrates a window and open drapery with associated drapery opening indicator.

| Reference Numerals In Drawings | | | |
|---|---|---|---|
| 10 | drapery support rod | 12 | drapery |
| 14 | window | 16 | window sill |
| 18 | support structure | 19 | window cross member |
| 20 | window support hook | 21 | self adhesive hook |
| 22 | thermistor R3 | 24 | thermistor R4 |
| 26 | power supply wire | 28 | light emitting diode D1 |
| 30 | resistor R1 | 32 | resistor R2 |
| 34 | resistor R5 | 36 | comparator U1 |
| 38 | blinds | 40 | blind control string |
| 42 | electric machinery | 44 | solenoid L1 |
| 45 | solenoid L2 | 46 | support plate |
| 48 | solenoid support bracket | 50 | shaft |
| 52 | shaft support bracket | 54 | solenoid rocker arm |
| 56 | string rocker arm | 58 | resistor R6 |
| 60 | capacitor C1 | 62 | operational amplifier U2 |
| 64 | resistor R7 | 66 | resistor R8 |
| 68 | resistor R9 | 70 | resistor R10 |
| 72 | comparator U3 | 74 | resistor R11 |
| 76 | transistor Q1 | 78 | resistor R12 |
| 80 | resistor R13 | 82 | capacitor C2 |
| 84 | resistor R14 | 86 | capacitor C3 |
| 88 | transistor Q2 | 92 | diode D2 |
| 94 | transistor Q3 | 98 | diode D3 |

| Part Description Table | |
|---|---|
| Reference Numeral | Description |
| 22 | 10K ohm, 1% thermistor |
| 24 | same as numeral 22 |
| 30 | 10K ohm, 0.25% resistor |
| 32 | same as numeral 30 |
| 34 | 1K ohm, ¼ watt, 5% resistor |
| 36 | integrated circuit, standard comparator, type CMP01CP |
| 38 | 14 millimeter size blinds, mounted on a 915 millimeter wide window |
| 44 | pull type solenoid, type 4-INT-12 D.C., Guardian Electric Manufacturing Co. |
| 45 | same type as numeral 44 |
| 58 | 2M ohm, ¼ watt, 5% resistor |
| 60 | 220 microfarad, 16 volt capacitor |
| 62 | integrated circuit, standard operational amplifier, type LM324N |
| 64 | 3.3K ohm, ¼ watt, 5% resistor |
| 66 | 6.8K ohm, ¼ watt, 5% resistor |
| 68, 70 | 10K ohm, ¼ watt, 5% resistors |
| 72 | same type as numeral 62 |
| 74 | 2.2K ohm, ¼ watt, 5% resistor |
| 76 | transistor type 2N3904 |
| 78 | 1K ohm, ¼ watt, 5% resistor |
| 80 | 15K ohm, ¼ watt, 5% resistor |
| 82 | same type as numeral 60 |
| 84 | same type as numeral 80 |
| 86 | same type as numeral 60 |
| 88 | power transistor, type IRF511 |
| 92 | diode, type 1N4001 |
| 94 | same type as numeral 88 |
| 98 | same type as numeral 92 |

DESCRIPTION-FIGS. 1 TO 3

Figure 1B:
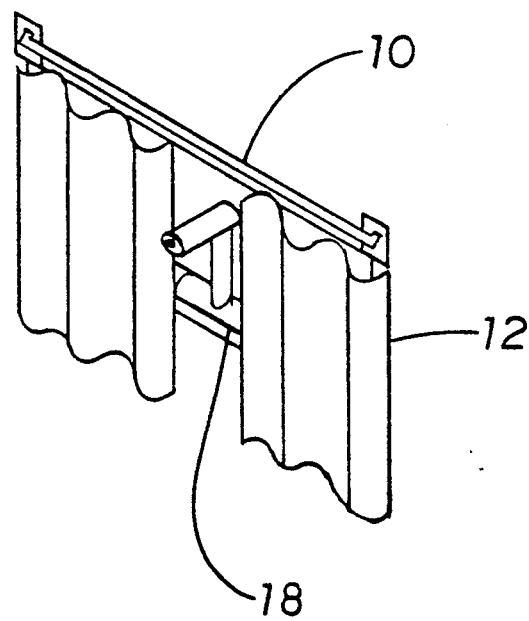
FIG. 1B illustrates a window and closed drapery with associated drapery opening indicator.

FIGS. 1A and 1B show isometric views of a version of the drapery opening indicator. A drapery support rod 10 holds a drapery 12. A support structure 18 rests on a window sill 16. Structure 18 leans against a window 14. While FIG. 1A shows structure 18 with drapery 12 open, FIG. 1B shows structure 18 with drapery 12 closed. A window covering comprises drapery 12.

Figure 2:
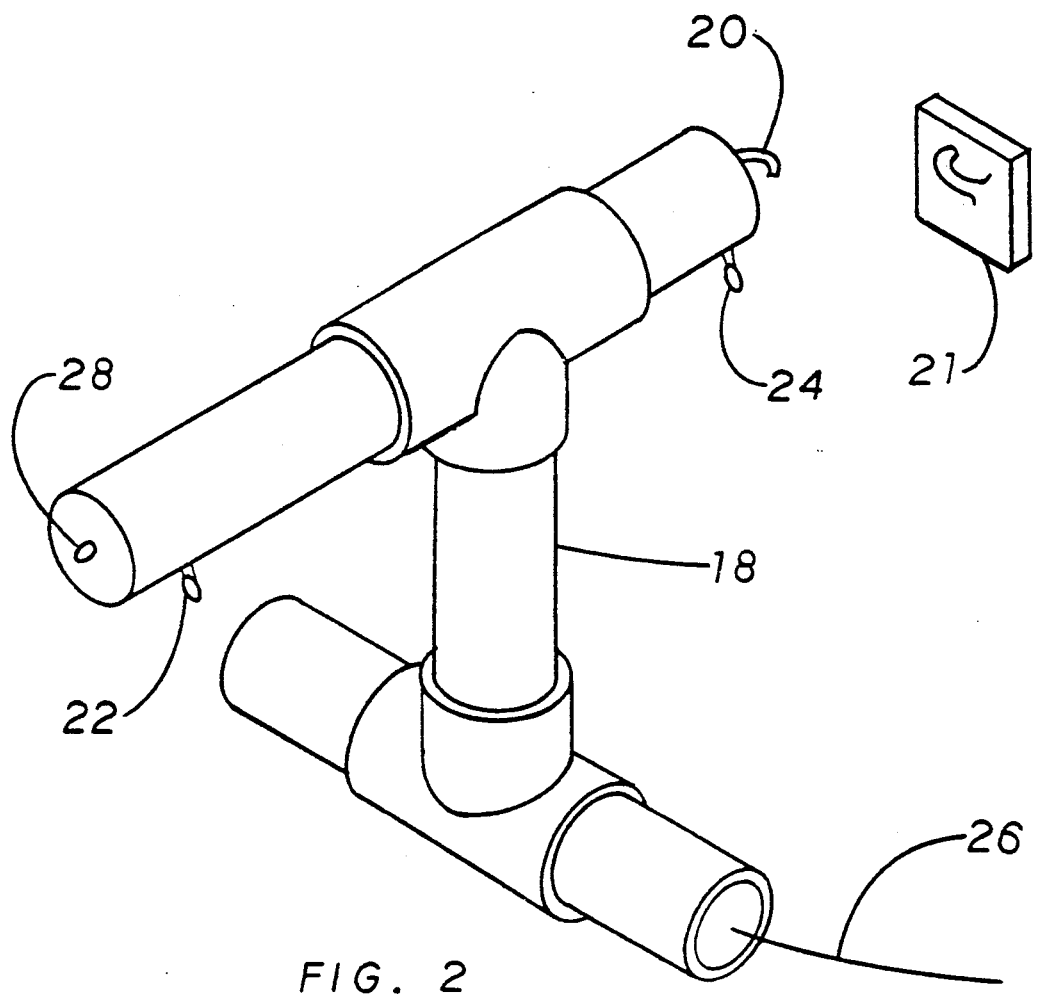
FIG. 2 is a detailed view of a drapery opening indicator.

FIG. 2 shows a detailed view of the drapery opening indicator. A thermistor R4 24 is mounted underneath structure 18 near the window end. R4 24 is located between drapery 12 and window 14 when structure 18 is mounted on sill 16. Likewise, a thermistor R3 22 is mounted underneath structure 18, but near the room end. Structure 18 supports R3 22 and R4 24 at a height of about ⅓ to ½ the window 14 height above sill 16. A light emitting diode D1 28 faces the room occupant. A window support hook 20 is mounted at the window end of structure 18. Hook 20 helps to support structure 18 by attaching to a window cross member 19 or a self adhesive hook 21. Lastly, a power supply wire 26 enters structure 18 at the bottom.

Figure 3:
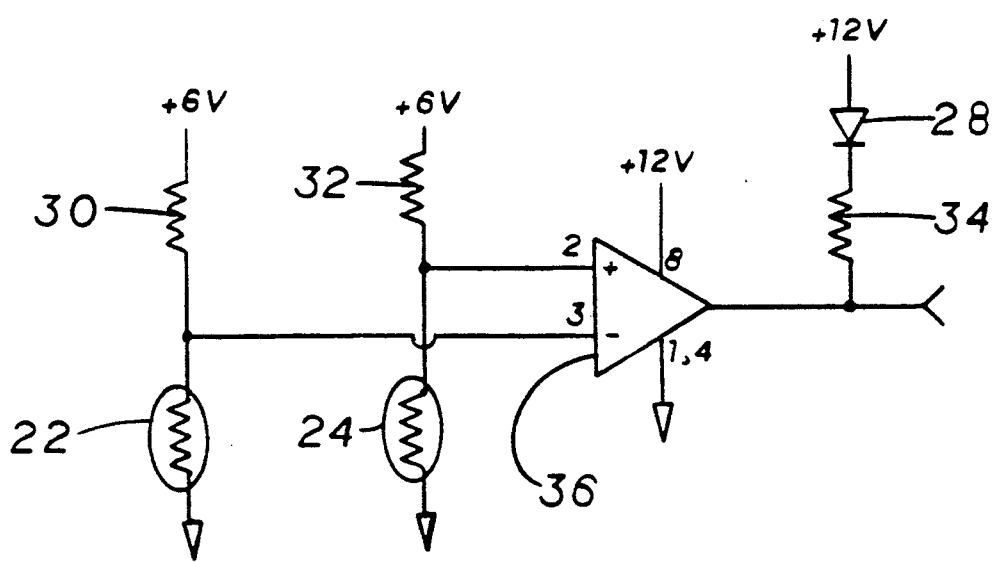
FIG. 3 is a schematic of an electronic circuit in a drapery opening indicator.

FIG. 3 is a detailed schematic of the electronic circuit contained in structure 18. It consists of a resistor R1 30, a resistor R2 32, a comparator U1 36, a resistor R5 34, D1 28, R3 22, and R4 24.

Figure 4:
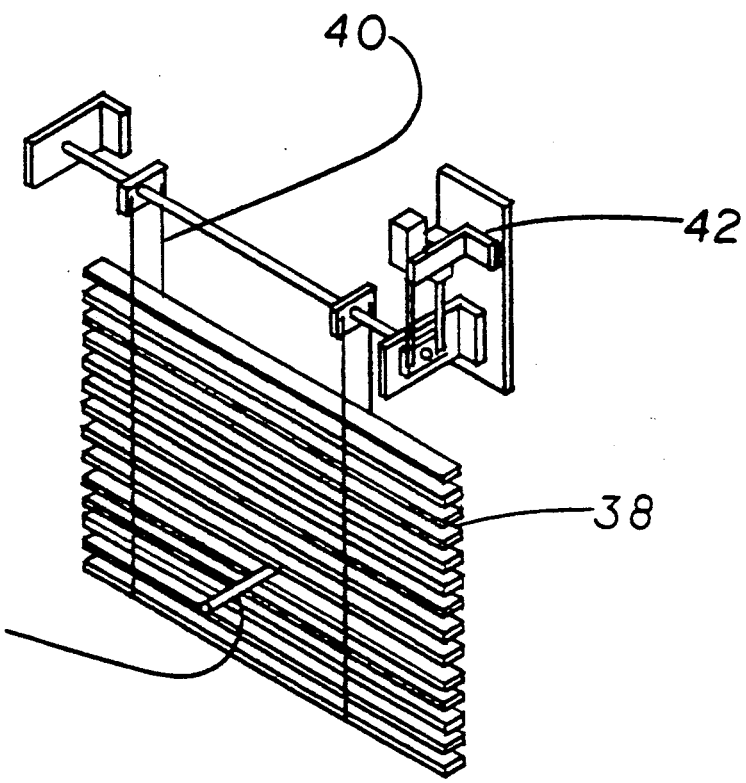
FIG. 4 is an overall view of a drapery opening indicator with a system for automatically opening or closing the window covering when blinds are used.

FIG. 4 is an overall view of an opening indicator with a system for automatically opening or closing the window covering. A blinds 38 is supported by a blind control string 40 at four locations. An electric machinery 42 is mounted above and to the right of blinds 38. Structure 18 protrudes thru blinds 38.

Figure 5:
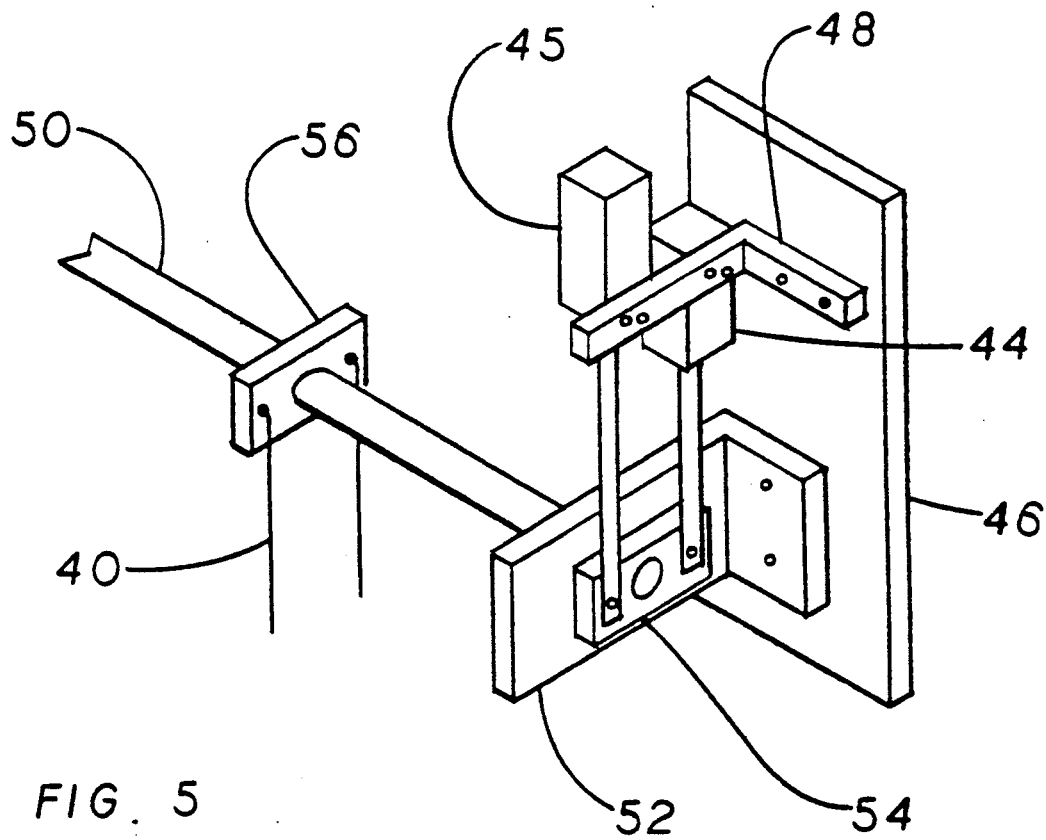
FIG. 5 is a detailed view of the electric machinery used to open or close the blinds in FIG. 4.

FIG. 5 shows a detailed view of machinery 42 in FIG. 4. A shaft 50 is supported horizontally by a shaft support bracket 52. A solenoid L1 44 and a solenoid L2 45 are supported by a solenoid support bracket 48. Bracket 48 is itself attached to a support plate 46. String 40 supports blinds 38 from each end of a string rocker arm 56. Each arm 56 is mounted rigidly on shaft 50. Likewise, a solenoid rocker arm 54 is mounted rigidly on shaft 50. L1 44 and L2 45 attach to each end of arm 54.

Figure 6:
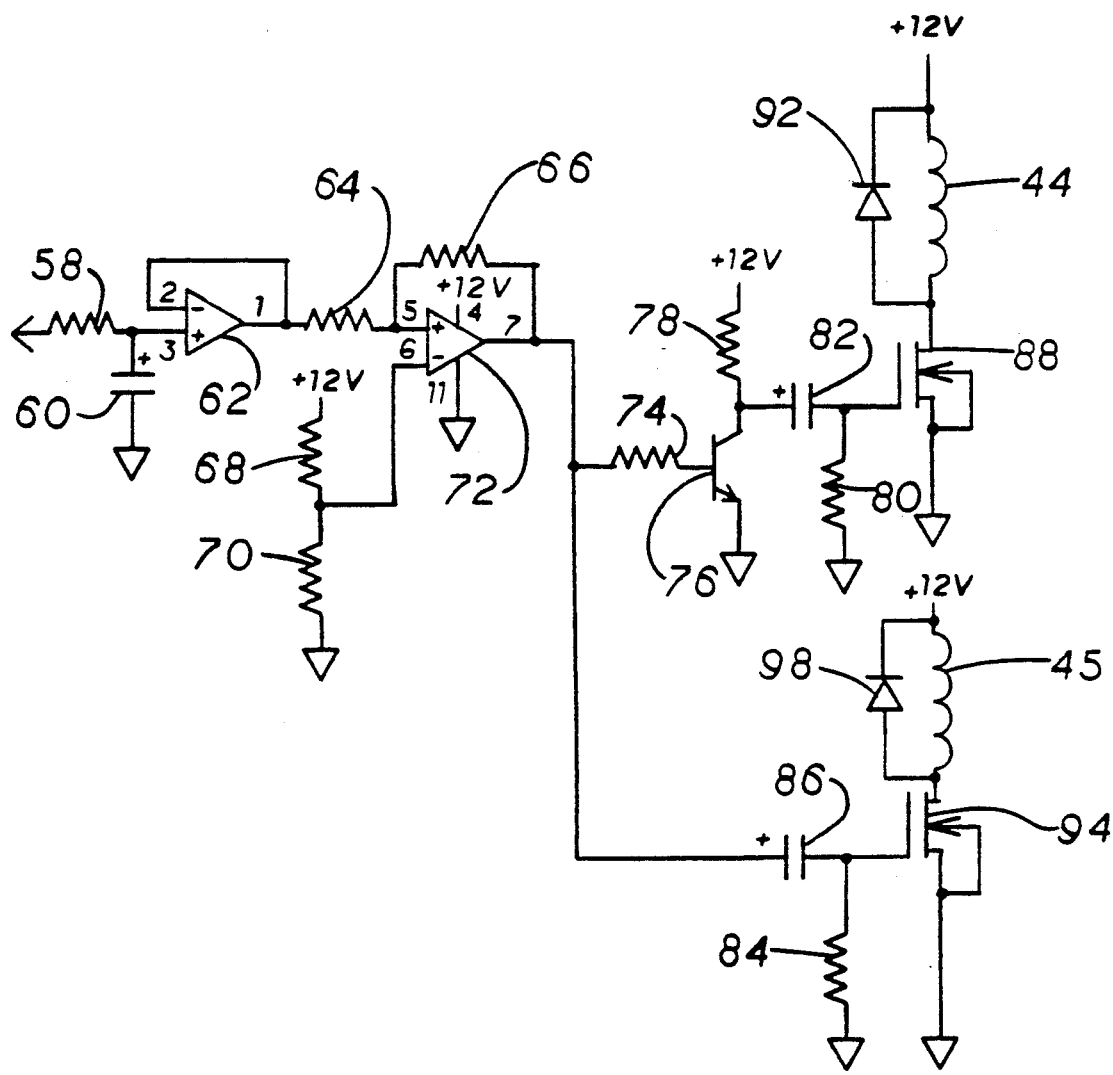
FIG. 6 is an electrical schematic of the system used to automatically open or close the blinds.

FIG. 6 is a detailed electrical schematic of the system used to automatically open or close blinds 38. The output of U1 36 of FIG. 3 ties to the left end of a resistor R6 58. The system consists of R6 58, a capacitor C1 60, an operational amplifier U2 62, a resistor R7 64, a resistor R8 66, and a comparator U3 72. Also included are a resistor R9 68, a resistor R10 70, a resistor R11 74, a transistor Q1 76, a resistor R12 78, a capacitor C2 82, a resistor R13 80, and a transistor Q2 88. In addition, L1 44, a diode D2 92, a resistor R14 84, a capacitor C3 86, a transistor Q3 94, a diode D3 98, and L2 45 are included.

OPERATION OF OPENING INDICATOR-FIGS. 1 TO 3

When the net heat flow is into the room, R4 24 will be warmer than R3 22. Also, when the thermistor temperature decreases, the resistance increases. Thus the voltage dividers consisting of R2 32, R4 24, R1 30, and R3 22 will apply a lower voltage at the noninverting input of U1 36 than at the inverting input of U1 36. This will cause the output of U1 36 to go to a low potential, turning D1 28 on. When D1 28 is lit the occupant of the room knows that opening drapery 12 will allow solar radiation to flow inward and help to heat the room. R2 32, R4 24, R1 30, and R3 22 comprise temperature sensing means. U1 36 comprises a comparative element. Also, R5 34 and D1 28 comprise an indicating element.

Likewise, when the net heat flow is out of the room, R3 22 will be warmer than R4 24. Thus, the voltage dividers consisting of R2 32, R4 24, R1 30, and R3 22 will apply a higher voltage at the noninverting input of U1 36 than at the inverting input of U1 36. This will cause the output of U1 36 to go to a high potential, turning D1 28 off. Thus the occupant of the room will know that keeping drapery 12 closed will help to reduce net heat loss to the outside.

R3 22 and R4 24 are mounted underneath structure 18. This is to reduce any possible errors that might be caused by exposure to direct sunlight.

OPERATION OF AUTOMATED SYSTEM-FIG. 4 TO 6

The automated system shown in FIGS. 4 to 6 can be used to automatically open or close the window covering. Here, when the opening indicator indicates the window covering should be opened, L1 44 is electronically actuated and shaft 50 is rotated. This causes arm 56 to become horizontal, opening blinds 38. Likewise, if the opening indicator indicates the window covering should be closed, L2 45 is actuated and shaft 50 is rotated. This causes arm 56 to tilt, closing blinds 38.

However, if clouds intermittently cover the sun, blinds 38 would open and close erratically. Hence a time delay circuit is necessary. This is implemented as follows. Initially, when blinds 38 should be opened, the output of U1 36 of FIG. 3 goes to a low potential. This begins to discharge C1 60 of FIG. 6 thru R6 58. U2 62 acts as a buffer from the voltage across C1 60. The time constant of R6 58 and C1 60 is about 7 minutes. This provides a delay for actuating the solenoids, but erratic operation could still occur. For example, the indicator could output a low, open blind voltage for 7 consecutive minutes. This would cause blinds 38 to open. Next, five seconds later, the indicator could output a high, close blind voltage. After about yet another 5 seconds, blinds 38 would close again. Thus, blinds 38 would have opened and closed during a period of only ten seconds.

Therefore, the next stage is necessary. A bistable hysteresis comparator consists of R7 64, R8 66, U3 72, R9 68, and R10 70. This causes a high or a low voltage to be generated, but with hysteresis. This circuit extends the ten second time period described above to about 7 minutes. A time delay mechanism comprises R6 58, C1 60, U2 62, R7 64, R8 66, R9 68, R10 70, and U3 72.

When the output of U3 72 goes to a low potential, the collector of Q1 76 goes to a high potential. While C2 82 is charging, a voltage develops across R13 80. This causes L1 44 to be momentarily actuated, opening the blinds.

Likewise, when the output of U3 72 goes to a high potential, L2 45 is momentarily actuated. This closes blinds 38. All components in FIG. 6 which are not a time delay mechanism comprise an electric machinery means.

Also, D2 92 and D3 98 act to suppress transients from L1 44 and L2 45. In addition, blinds 38 should close fully and be made of a thermally insulating material for maximum savings.

SUMMARY, RAMIFICATIONS, AND SCOPE

Thus the reader will see that the solar heating drapery opening indicator is a simple, economical, yet effective device with widespread potential appeal. Furthermore the drapery opening indicator has the additional advantages that

- it enables the utilization of solar heating with a simple retrofit on present structures;
- it conserves energy without sacrificing comfort;
- it utilizes solar heating in an economically feasible manner.

While my above description contains many specifities, these should not be construed as limitations on the scope of the invention, but rather as an exemplification of one preferred embodiment thereof. Many other variations are possible. For example, the overall shape of the support structure can be changed. Other types of temperature sensors can be used. For example, closely matched diodes and resistors could be used instead of thermistors. Also, the comparator might be eliminated if temperature sensors with large enough electrical variations were available.

Accordingly, the scope of the invention should be determined not by the embodiments illustrated, but by the appended claims and their legal equivalents.

What is claimed is:

1. An apparatus for detecting heat flow through a window and window covering so as to conserve energy, said apparatus comprising:
   a support structure constructed and arranged for mounting proximate said window;
   a plurality of temperature sensing means mounted on said support structure, a first one of said temperature sensing means being supported proximate said window and a second one of said temperature sensing means being supported within said room and a sufficient distance from said window so as to allow said window covering to be closed on said window;
   means for comparing the temperature of said first and second temperature sensing means;
   means for indicating when said first temperature sensing means is warmer than said second temperature sensing means, thereby indicated that said window covering should be opened; and
   a power supply for operating said apparatus.

2. The apparatus of claim 1 wherein said means for indicating when said first temperature sensing means is warmer than said second temperature sensing means comprises a light emitting diode.

3. The apparatus of claim 1 wherein said means for comparing the temperature of said first temperature sensing means and said second temperature sensing means comprises a plurality of voltage dividers, a comparator and a plurality of resistors constructed and arranged for indicating when solar radiation passing through said window will allow heat to flow into the room.

4. The apparatus of claim 3 wherein said first resistor and first temperature sensing means are connected to a non-inverting input from said comparator, said second resistor and said second temperature sensing means are connected to an inverting input from said comparator and said indicating means is connected to the output of said comparator whereby when the temperature of said first temperature sensing means is greater than the temperature of said second temperature sensing means the output of said comparator will go to a low potential turning said light emitting diode on, thereby indicating that said window covering should be open.

5. The apparatus of claim 1 wherein said support structure comprises:
   a tubular member extending substantially vertically along the surface of said window;
   a base member supporting said first tubular member on the window sill of said window;
   a third tubular member extending substantially horizontally away from said window into said room; and
   a window support hook connected to the surface of said window so as to maintain said apparatus in a substantially vertical position.

6. The apparatus of claim 1 further comprising:
   means for automatically opening said window covering when said first temperature sensing means is warmer than second temperature sensing means and means for automatically closing said window covering when said second temperature sensing means is warmer than said first temperature sensing means.

7. The apparatus of claim 6 wherein said means for opening and closing said window covering comprises an electric machinery means electrically connected to said means for comparing temperature and mechanically connected to said window covering so as to open or close said window covering, as required.

8. The apparatus of claim 7 and further comprising:
   a time delay mechanism for opening or closing said window covering after a selected period of time.

9. The apparatus of claim 1 wherein said power supply comprises an electrical wire, a plug member interconnected thereto and a transformer for transforming electrical current from said electrical wire to a desired voltage and/or amperage level.

10. The apparatus of claim 1 wherein said power supply means comprises one or more batteries.

11. The apparatus of claim 1 wherein said temperature sensing means comprises a thermistor.

12. The apparatus of claim 1 wherein said temperature sensing means comprises a diode.

13. The apparatus of claim 1 wherein said temperature sensing means comprises a bimetallic strip.

14. The apparatus of claim 1 wherein said window covering comprises one or more drapes.

15. The apparatus of claim 1 wherein said window covering comprises one or more blinds.

* * * * *